United States Patent [19]

Izeki et al.

[11] Patent Number: 4,974,178
[45] Date of Patent: Nov. 27, 1990

[54] EDITING APPARATUS FOR AUDIO AND VIDEO INFORMATION

[75] Inventors: Hirosuke Izeki; Hidemasa Kitagawa, both of Osaka; Tetsuro Hanaoka, Nara; Koichiro Endo; Yoshihiro Mori, both of Osaka, all of Japan

[73] Assignee: Matsushita Electric Industrial Co., Ltd., Japan

[21] Appl. No.: 123,551

[22] Filed: Nov. 20, 1987

[30] Foreign Application Priority Data

| Nov. 20, 1986 | [JP] | Japan | 61-277270 |
| Jan. 6, 1987 | [JP] | Japan | 62-772 |
| Apr. 23, 1987 | [JP] | Japan | 62-101392 |
| Apr. 23, 1987 | [JP] | Japan | 62-101393 |
| Jun. 17, 1987 | [JP] | Japan | 62-151638 |
| Jul. 14, 1987 | [JP] | Japan | 62-175183 |
| Oct. 5, 1987 | [JP] | Japan | 62-251020 |

[51] Int. Cl.⁵ .......................... G06F 15/66
[52] U.S. Cl. .................... 364/523; 364/518
[58] Field of Search ............... 364/518-521, 364/523, 200 MS File, 900 MS File; 340/709, 711; 360/14.1, 14.3

[56] References Cited

U.S. PATENT DOCUMENTS

| 4,272,790 | 6/1981 | Bates | 360/14.1 |
| 4,394,745 | 7/1983 | Menezes et al. | 364/900 |
| 4,584,574 | 4/1986 | Beausoleil | 340/744 |
| 4,677,571 | 6/1987 | Riseman et al. | 364/519 |
| 4,709,277 | 11/1987 | Ninomiya et al. | 360/14.1 X |
| 4,723,210 | 2/1988 | Barker et al. | 364/300 |
| 4,742,344 | 5/1988 | Nakagawa et al. | 340/723 |
| 4,746,994 | 5/1988 | Ettlinger | 360/14.1 X |
| 4,786,894 | 11/1988 | Furusawa et al. | 340/709 |

FOREIGN PATENT DOCUMENTS 60-148274 8/1985 Japan.

OTHER PUBLICATIONS

"Scene Adaptive Coder", W. H. Chen et al., IEEE Transactions on Communications, vol. COM-32, No. 3, Mar. 1984, pp. 225-232.
Product Description of Denon PCM Editing System DN-052ED Available from Nippon Columbia Co., Ltd. of Tokyo, Japan.
IEEE Global Telecommunications Conference, Conference Record vol. 3 of 3, Dec. 1982, pp. 831-835, Miami, U.S.A.; R. Gordon: "An Intelligent Electronic Book System and Publishing Facility".

Primary Examiner—Dale M. Shaw
Assistant Examiner—H. R. Herndon
Attorney, Agent, or Firm—Lowe, Price, LeBlanc, Becker & Shur

[57] ABSTRACT

Information including pictures, sounds, and characters is inputted. A form of the inputted information is converted into a prescribed format in accordance with properties of the information, and thus converted information is derived. A first storage means holds the inputted information and/or the converted information. The information held in the first storage means is edited, and thus edited information is derived. A reproduction sequence is generated. A second storage means holds the edited information. The information held in the first storage means and/or the second storage means is reproduced in the reproduction sequence to allow a check on the information and the reproduction sequence. The information held in the first storage means or the second storage means is outputted for manufacturing a recording medium.

18 Claims, 8 Drawing Sheets

EDITING APPARATUS FOR AUDIO AND VIDEO INFORMATION

BACKGROUND OF THE INVENTION

This invention relates to an apparatus for editing information including pictures, sounds, characters, and others.

Computer-based or electronic filing systems act on various information including pictures, sounds, characters, and others. In the filing system, the information is sometimes edited and processed before being filed into a recording medium or a storage unit. The information can be reproduced from the recording medium.

Editing or compilation of sound information is designed so that the sounds can be reproduced in real time. Compilation of information including a combination of pictures and related sounds is designed so that the pictures and the sounds can be reproduced synchronously.

Japanese published unexamined patent application No. 60-148274 discloses an electronic filing system which allows picture information and related character information to be easily recorded in a common file.

SUMMARY OF THE INVENTION

It is an object of this invention to provide a reliable information editing apparatus.

It is another object of this invention to provide an efficient information editing apparatus.

In an information editing apparatus according to a first aspect of this invention, a signal representing information is received. The information is edited, and thus edited information is derived. The edited information is simulatively reproduced to allow a check on the edited information. A signal representing the edited information is outputted.

In an information editing apparatus according to a second aspect of this invention, information including pictures, sounds, and characters is inputted. A form of the inputted information is converted into a given form in accordance with properties of the information, and thus converted information is derived. A first storage means holds the inputted information or the converted information. The information held in the first storage means is edited, and thus edited information is derived. A reproduction sequence is generated. A second storage means holds the edited information. The information held in the first storage means or the second storage means is reproduced in the reproduction sequence to allow a check on the information and the reproduction sequence. The information held in the first storage means or the second storage means is outputted.

In an information editing apparatus according to a third aspect of this invention, information including pictures, sounds, and characters is inputted. A form of the inputted information is converted into a given form in accordance with properties of the information, and thus converted information is derived. A first storage means holds the inputted information or the converted information. The information held in the first storage means is edited, and thus edited information is derived. A reproduction sequence is generated. A second storage means holds the edited information. The information held in the first storage means or the second storage means is reproduced in the reproduction sequence to allow a check on the information and the reproduction sequence. The information held in the first storage means or the second storage means and the reproduction sequence are corrected in accordance with result of the check. The information held in the first storage means or the second storage means is outputted.

DESCRIPTION OF THE FIRST PREFERRED EMBODIMENT

Figure 1:
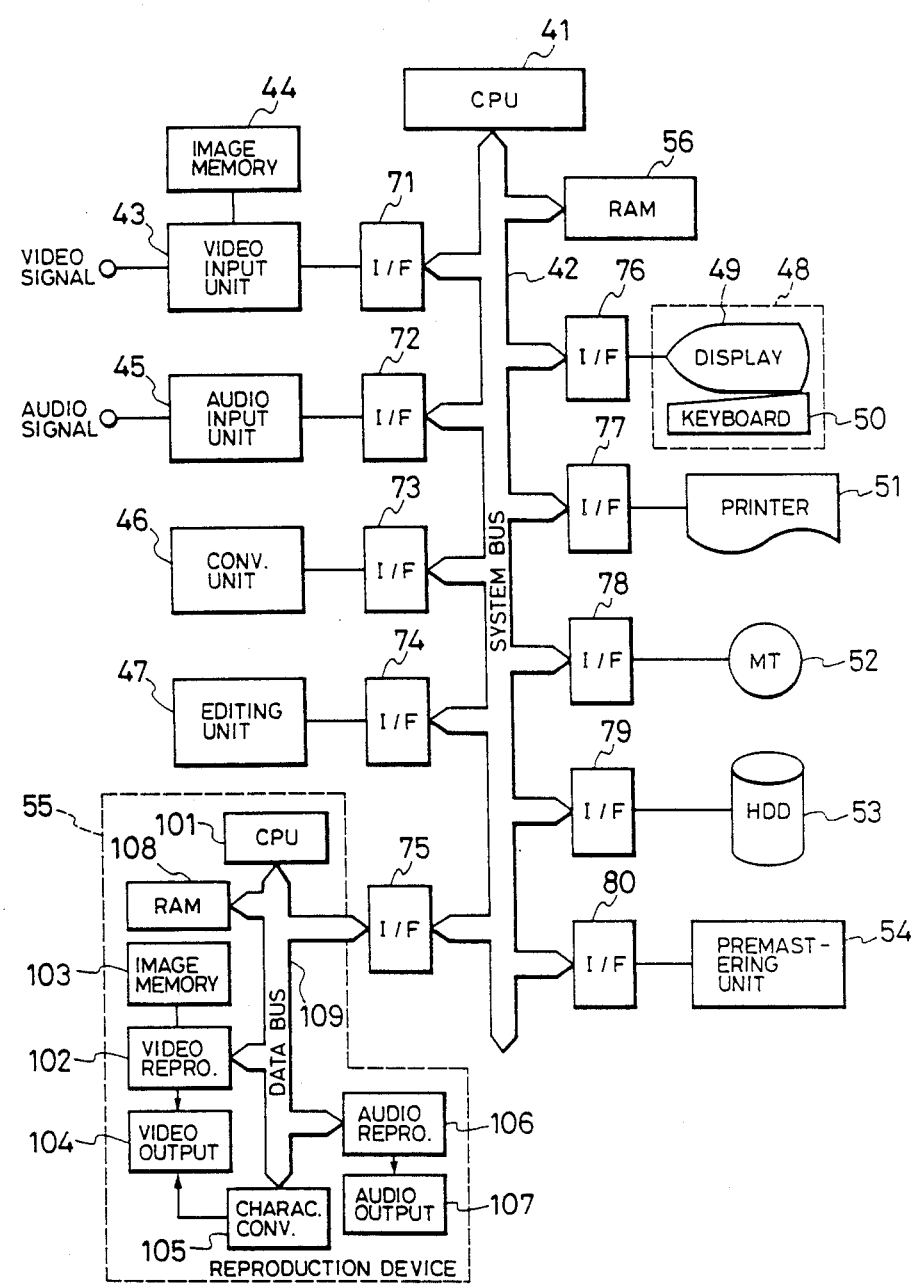
FIG. 1 is a block diagram of an information editing apparatus according to a first embodiment of this invention.

With reference to FIG. 1, an information editing apparatus includes a central processing unit (CPU) 41 for controlling operation of the editing apparatus. A system bus 42 connects the CPU 41, a random-access memory (RAM) 56, and interface units 71–80.

A video input unit 43 receives a video signal representing picture information. An image memory 44 holds the video signal received by the video input unit 43. The video signal is digitized and data of video signal (video data) is transferred from the devices 43 and 44 to the system bus 42 via the interface 71.

An audio input unit 45 receives an audio signal representing sound information. The audio signal is digitized and data representative of the audio signal (audio data) is transferred to the system bus 42 via the interface 72.

A conversion unit 46 receives the video data and/or the audio data from the system bus 42 via the interface 73 and converts them. For example, the conversion unit 46 compresses the inputted video and/or audio data to the prescribed data format. The converted data is returned from the conversion unit 46 to the system bus 42 via the interface 73. One example of such a conversion unit is described in "Scene Adaptive Coder", W. H. Chen et al., IEEE Transactions on Communications, Vol. COM-32, No. 3, March 1984, pp. 225–232.

An editing unit 47 receives data from the system bus 42 via the interface 74 and edits and/or processes the information. The edited and/or processed data is returned to the system bus 42 via the interface 74. Such editing units are known in the art and are available from Nippon Columbia Co., Ltd., of Tokyo, Japan under the designation Denon PCM Editing System DN-052ED. Model DN-036ED was developed in 1981.

A console 48 includes a display unit 49 and a keyboard 50. A user can input instructions and data of character information into the information editing apparatus via the keyboard 50. The inputted instructions and character data are transferred from the console 48 to the system bus 42 via the interface 76. The display unit 49 receives the instructions and the character data from the keyboard 50 and indicates them.

A printer 51 receives various data and/or programs (information files) from the system bus 42 via the interface 77 and prints the data and/or programs.

A magnetic tape (MT) unit 52 receives information files from the system bus 42 via the interface 78 and holds the received files. The information files can be returned from the magnetic tape unit 52 to the system bus 42 via the interface 78. The magnetic tape unit 52 serves as a data backup memory.

A hard disk (HDD) unit 53 constitutes a storage device which holds information files transferred from the system bus 42 via the interface 79. The information files can be returned to the system bus 42 via the interface 79. Specifically, the hard disk unit 53 holds the information files which are processed and/or edited by the conversion unit 46 and the editing unit 47.

A premastering unit 54 constitutes an output device which receives information files from the system bus 42 via the interface 80. The premastering unit 54 outputs the information files in the form of a master tape or the like.

The RAM 56 constitutes a main storage unit which holds a program and/or information files transferred from the system bus 42.

A reproduction device 55, such as a simulation means, receives information files from the system bus 42 via the interface 75. Specifically, the information files are transferred to the reproduction device 55 from the hard disk unit 53. The reproduction device 55 checks whether or not the information files were converted and edited correctly, and confirms whether or not the information can be reproduced accurately.

An image pickup device (not shown), such as a television camera, generates a video signal representative of picture information which is applied to the video input unit 43. The video signal is digitized and video data is transferred from the video input unit 43 to the hard disk unit 53 via the interfaces 71 and 79, and the system bus 42. The transferred video data is stored in the hard disk unit 53. Before being transferred to the hard disk unit 53, the video data may be preliminarily processed and edited by use of the image memory 44. An external unit (not shown) generates a video signal representative of a graph, animation, or the like which is applied to the video input unit 43. This video data is transferred from the video input unit 43 to the hard disk unit 53, and is then stored in the hard disk unit 53. A video data representative of a graph, animation, or the like may be produced within the video input unit 43 by use of a constructing function of the video input unit 43. An audio reproduction device (not shown), such as an audio tape recorder, generates an audio signal representative of sound information which is applied to the audio input unit 45. The audio signal is digitized and audio data is transferred from the audio input unit 45 to the hard disk unit 53 via the interfaces 72 and 79, and the system bus 42. The transferred audio data is stored in the hard disk unit 53. Character information is inputted via the keyboard 50 in the console 48. The data of the inputted character information is transferred from the console 48 to the hard disk unit 53 via the interfaces 76 and 79, and the system bus 42. The transferred character data is stored in the hard disk unit 53. Character data may be inputted via the magnetic tape unit 52. In this case, the character data is derived from a signal representative of characters which is held by a magnetic tape. The character data is transferred from the magnetic tape unit 52 to the hard disk unit 53 via the interfaces 78 and 79, and the system bus 42. The transferred character data is stored in the hard disk unit 53.

The information files inputting processes, the information transferring processes, and the information storing processes are controlled via operation of the CPU 41 which is determined by an application program or instructions inputted via the keyboard 50. The instructions determining operation of the CPU 41 may be pre-stored in the RAM 56.

Information files required to undergo conversion such as data compression is transferred from the hard disk unit 53 to the conversion unit 46 via the interfaces 79 and 73, and the system bus 42. The conversion unit 46 processes the transferred information files and changes the form of the information files into a prescribed format. For example, the video data is subjected to $\Delta$YUV transformation and the audio data is subjected to ADPCM conversion (8 bit, 4 bit). After the conversion is completed, the resultant information files are returned from the conversion unit 46 to the hard disk unit 53 via the interfaces 73 and 79, and the system bus 42, and is stored in the hard disk unit 53 as a converted data file. It should be noted that the inputted information may be directly subjected to the process in the conversion unit 46 before being transferred to the hard disk unit 53.

During the information conversion process in the conversion unit 46, a data file is generated in respect of or added to each of information files. The generated data file is stored in the hard disk unit 53 as a control file. Specifically, the control file represents properties or attributes of each of information files, such as the title of the file, the kind of the data, the length of the data, the way of converting the data, and other file to be synchronous therewith. Other information files are previously produced and stored in a magnetic tape for backup. These information files are inputted via the magnetic tape unit 52, being transferred from the magnetic tape unit 52 to the hard disk unit 53 via the interfaces 78 and 79, and the system bus 42 and being stored in the hard disk unit 53. The generation and addition of the information files, and the inputting and transfer of the information files are controlled via the CPU 41 in accordance with a program stored in the RAM 56 or other memories.

A scenario represents the kinds and contents of information, the way of retrieval and search of the information, the sequence of reproduction of the information, and others. Such a scenario was previously prepared. An application program determining a specific sequence of reproduction of information and an arrangement of data files is produced on the basis of the scenario. A user sets the information reproduction sequence and the data arrangement by inputting instructions via the keyboard 50 while monitoring the display 49 indicating the sequence and the arrangement. Instructions may also be prepared by use of an external unit (not shown) and inputted via the magnetic tape unit 52 or other input units. Arrangement and combination of the information files in the storage medium are determined in accordance with the contents of the control files and the inputted instructions. The contents of the arrangement and combination are filed as program files by the editing unit 47. The program files are transferred from the editing unit 47 to the hard disk unit 53 via the interfaces 73 and 79 and the system bus 42, and are stored in the hard disk unit 53.

The editing unit 47 processes and/or edits the information files containing video data, audio data, character data, and other information. Specifically, the data in the files are divided into blocks of one unit and the blocks of the files are interleaved or overlapped in accordance with the properties and kinds of the files, the arrangement of the files in the storage medium, and the combinations of other data files synchronous therewith. In addition, the forms of data files are converted into prescribed formats determined in the storage medium. The data files in the prescribed formats are transferred from the editing unit 47 to the hard disk unit 53 via the interfaces 74 and 79, and the system bus 42 and are stored in the hard disk unit 53. For example, the editing and processing of the data files allow operation as follows. When the name of a piece of information containing a picture and related sounds is denoted, the picture is indicated on a display and the sounds are synchronously reproduced from an electricity-to-sound transducer such as a loudspeaker.

The reproduction device 55 operates as the simulation means to check whether the contents of the edited and/or processed information files were converted correctly and thus confirms whether the information files can be accurately reproduced in the predetermined reproduction sequence. The reproduction device 55 includes a central processing unit (CPU) 101, a video reproduction unit 102, a character conversion unit 105, an audio reproduction unit 106, and a random-access memory (RAM) 108 mutually connected via a data bus 109. The CPU 101 controls operation of the reproduction device 55. An image memory 103 is connected to the video reproduction unit 102. The video reproduction unit 102 and the character conversion unit 105 are connected to a video output unit 104. An audio output unit 107 is connected to the audio reproduction unit 106. The video reproduction unit 102 preferably includes a digital-to-analog converter which derives an analog video signal from a digital signal representing picture information. The character conversion unit 105 preferably includes a digital-to-analog converter which derives an analog video signal from a digital signal representing character information. The audio reproduction unit 106 preferably includes a digital-to-analog converter which derives an analog audio signal from a digital signal representing sound information. The video output unit 104 preferably includes a display such as a CRT display. The audio output unit 107 preferably includes a loudspeaker.

The program file determining the sequence of reproduction of the data file stored in the storage medium is transferred from the hard disk unit 53 to the RAM 108 within the reproduction device 55 via the interfaces 79 and 75, the system bus 42, and the data bus 109. The transferred program file is stored in the RAM 108, and a simulation process is started. The CPU 101 operates in accordance with the program in the file, enabling the simulation process. First, the CPU 101 allows the respective data files to be inputted from the hard disk unit 53 into the reproduction device 55 via the interfaces 79 and 75, and the system bus 42 in the predetermined sequence given in the program file. Secondly, the CPU 101 allows the video data, the character data, and the audio data of the data files to be decoded or demodulated via the video reproduction unit 102, the character reproduction unit 105, and the audio reproduction unit 106 respectively. Thirdly, the CPU 101 allows the demodulated video signal and the character signal to be visualized via the video output unit 104 and allows the demodulated audio signal to be made audible via the audio output unit 107. In this way, the reproduction device 55 reproduces the data of the files within the hard disk unit 53 in a simulation process. This simulation process allows easy check and confirmation as to whether the real-time reproduction of sound information, the combination of a picture and related sounds, and the reproduction timings can be correct in a later formal reproduction process. Accordingly, without any final storage medium such as an optical disk, a confirmation can be made as to whether a denoted piece of information files can be found correctly during a search, and whether a picture and related sounds can be reproduced at correct timings and in correct sequences during a later formal reproduction process. This confirmation enables the files to be edited efficiently.

In cases where defects are found in the generated information (data) files and the reproduction sequence during the simulative reproduction process, the contents of the defects are transferred from the reproduction device 55 to the RAM 56. The CPU 41 allows the contents of the defects to be further transferred to the corresponding units (for example, the input unit, the conversion unit, and the editing unit), and necessary corrections of the defects are performed in the corresponding units. In the case where the contents of corrections are required to be produced and instructed by the user, the contents of corrections are indicated by the display 49 and necessary instructions are inputted via the keyboard 50.

For example, in cases where the information (data) file differs from a corresponding information (data) file determined by the program file and the information (data) can not be reproduced in the desired reproduction sequence, the information (data) file is reconstructed in the editing unit. In cases where the conversion and process of the information (data) file were defective, the data conversion and process are done over again.

The contents of the reproduction sequence produced in the editing unit 47 are corrected in the conversion unit 46 in accordance with result of the check during the simulative reproduction. The corrected reproduction sequence is tranferred from the editing unit 47 to the hard disk unit 53 via the interfaces 74 and 78, and the system bus 42. It should be noted that the contents of the simulative reproduction may be confirmed in the form of a data file sequence by use of the display 49.

The program file and the data files which were checked in the simulative reproduction via the reproduction device 55 are corrected finally in the conversion unit 46 and are given final storing sequence and arrangement. After the check on the final storing sequence and arrangement, the corrected program file and the corrected data files are converted in form and are stored in the hard disk unit 53. The final program file and the final data files are transferred from the hard disk unit 53 to the premastering unit 54 via the interfaces 79 and 80, and the system bus 42. The premastering unit 54 produces a master tape holding the transferred files. The master tape is used in manufacturing a recording medium. The respective information files produced in the editing process are transferred from the hard disk unit 53 to the magnetic tape unit 52 via the interfaces 79 and 78, and the system bus 42. The magnetic tape unit 52 produces a backup tape holding the received information files.

As understood from the previous desription, the conversion unit 46 is used as means for performing a conversion process such as a data compression process on inputted information or generating process of control file. The conversion process or control file generation may be performed in each of the video input unit 43 and the audio input unit 45. In this case, the exclusive conversion unit 46 may be omitted.

As understood from the previous description, the conversion unit 46 and the editing unit 47 are used as means for converting and editing the information. The CPU 41 may be designed to act as the converting and editing means by use of a software process or a program.

The video input unit 43, the audio input unit 45, and the editing unit 47 may be designed to have a function similar to the function of the conversion unit 46 in order to remove the exclusive conversion unit 46. The editing unit 47 and the conversion unit 46 may be replaced by exclusive signal processors.

Figure 2:
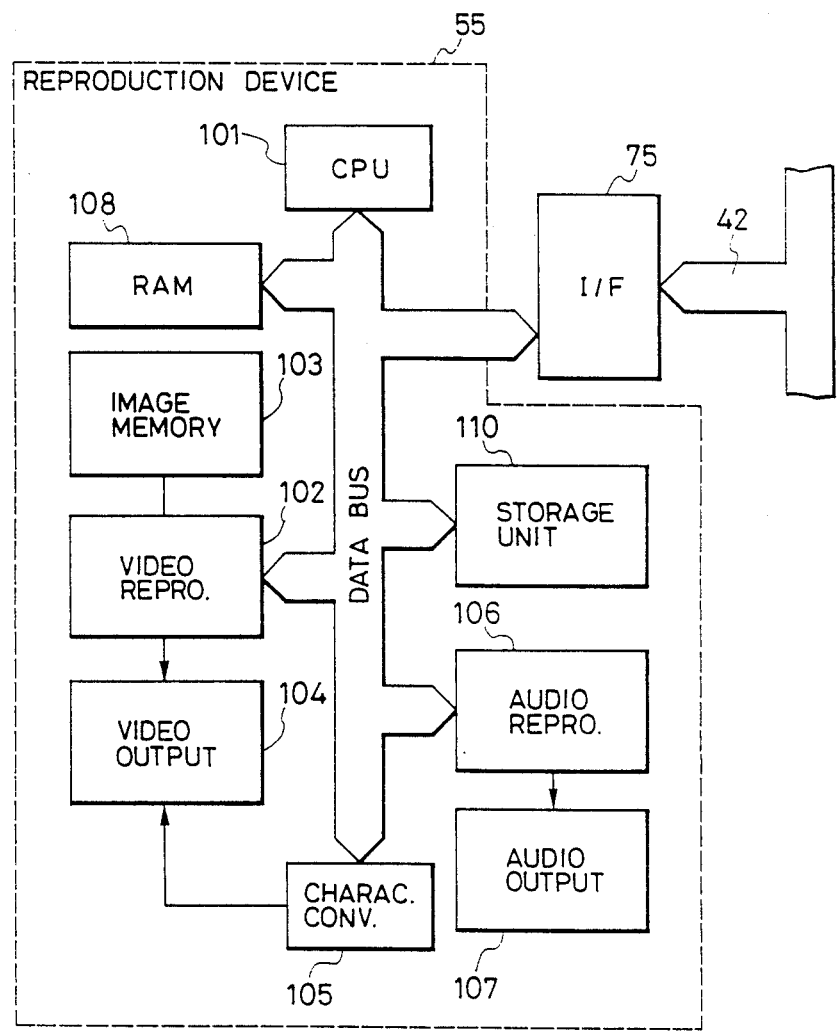
FIG. 2 is a block diagram of a modified reproduction device as a simulation means.

FIG. 2 shows a modified reproduction device as a simulation means, which is similar to the reproduction device of FIG. 1 except that a large storage unit 110 connected to the data bus 109 is added. For example, the storage unit 110 is composed of a write-once optical disk unit. The storage unit 110 may also be composed of an erasable magneto-optical disk unit or a semiconductor memory unit. The data to be used in the simulation process are transferred from the hard disk unit 53 (see FIG. 1) to the storage unit 110 via the interfaces 79 (see FIG. 1) and 75, the system bus 42, and the data bus 109. The simulative reproduction of the data is performed in the sequence given by the program file. Before the simulative reproduction starts, the data files to be used are transferred from the hard disk unit 53 to the storage unit 110. Accordingly, during the simulative reproduction, no data file is transferred between the hard disk unit 53 and the reproduction device 55 and the necessary data are transferred from the internal storage unit 110 to the other units within the reproduction device 55. As a result, the reproduction device 55 of FIG. 2 allows a simulative data reproduction to be adequately close to a formal data reproduction via the actually produced recording medium. In addition, the sequence and control for the simulative reproduction can be simple.

DESCRIPTION OF THE SECOND PREFERRED EMBODIMENT

Figure 3:
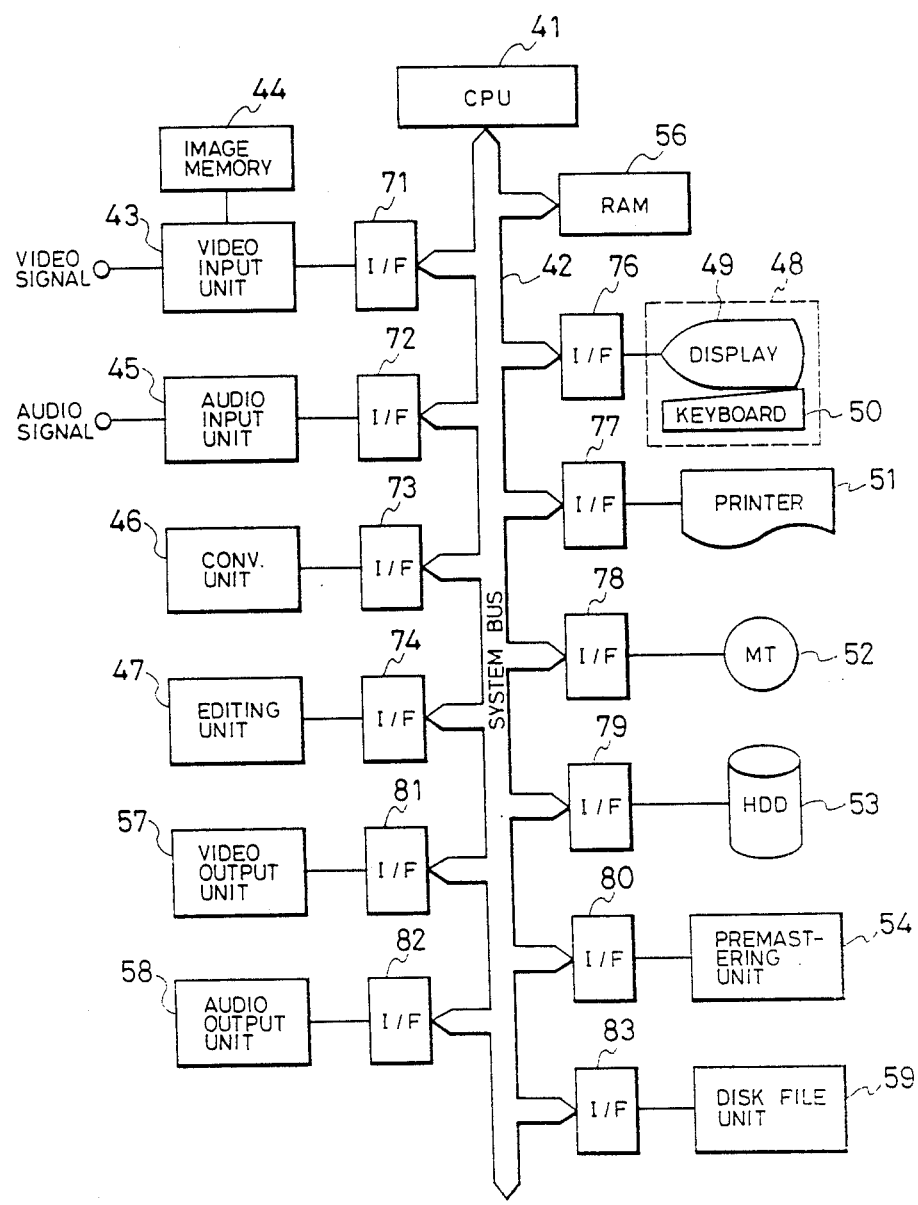
FIG. 3 is a block diagram of an information editing apparatus according to a second embodiment of this invention.

FIG. 3 shows a second embodiment of this invention which is similar to the embodiment of FIG. 1 except for design changes described hereinafter.

The reproduction device 55 (see FIG. 1) and the associated interface 75 (see FIG. 1) are omitted from the embodiment of FIG. 3.

In the embodiment of FIG. 3, a video output unit 57 connected to the system bus 42 via an interface 81 serves to visualize video data and character data. The video output unit 57 includes a display such as a CRT display. In addition, an audio output unit 58 connected to the system bus 42 via an interface 82 serves to make audio data audible. The audio output unit 58 includes an electricity-to-sound transducer such as a loudspeaker. Furthermore, a disk file unit 59 connected to the system bus 42 via an interface 83 stores edited and processed final information files in a removable recording medium. The disk file unit 59 uses a disk-shaped recording medium such as an optical disk or an erasable magneto-optical disk.

The program file is transferred from the hard disk unit 53 to the RAM 56 via the interface 79 and the system bus 42. When the program file is stored in the RAM 56, the CPU 41 starts simulation control in accordance with the contents of the program file.

During the simulation process, the data files are transferred from the hard disk unit 53 to the video output unit 57 and the audio output unit 58 via the interfaces 79, 81, and 82, and the system bus 42 in a predetermined sequence given by the program file. Picture information and character information in the data files are reproduced via the video output unit 57. Sound information in the data files is reproduced via the audio output unit 58.

After the program file and the data files are checked in the simulative reproduction and are edited again, their final sequence and arrangement are determined and the resultant files are transferred to the disk file unit 59. The disk file unit 59 stores the program file and the data files in a removable recording medium such as an optical disk.

The CPU 41 also allows a simulative reproduction of the files in the disk file unit 59. After the files are checked in the simulative reproduction and are finally edited, the resultant files are transferred from the disk file unit 59 to the premastering unit 54 via the interfaces 83 and 80, and the system bus 42.

The disk file unit 59 may be designed to serve also as the premastering unit 54. In this case, the premastering unit 54 can be omitted.

As understood from the previous description, the embodiment of FIG. 3 can dispense with an exclusive simulation device.

DESCRIPTION OF THE THIRD PREFERRED EMBODIMENT

Figure 4:
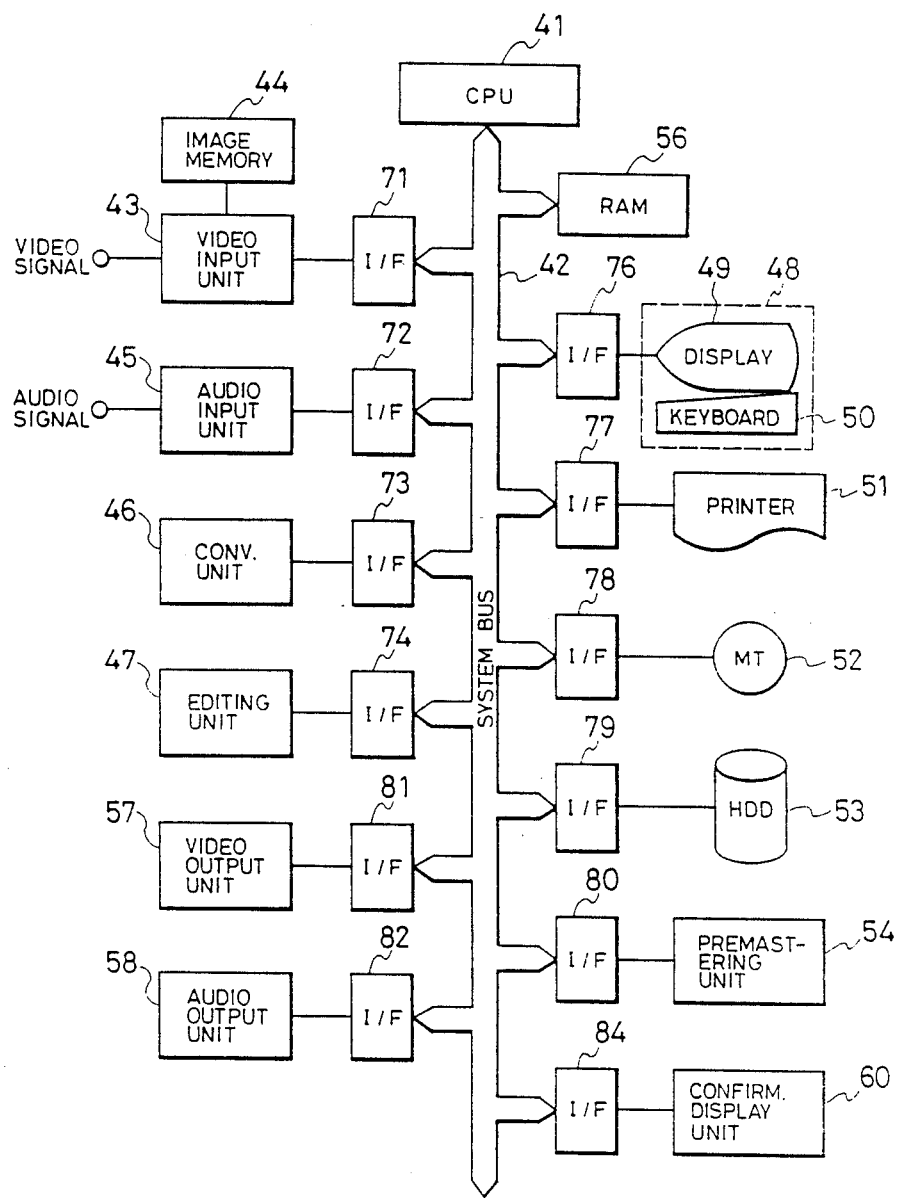
FIG. 4 is a block diagram of an information editing apparatus according to a third embodiment of this invention.

FIG. 4 shows a third embodiment of this invention which is similar to the embodiment of FIG. 3 except for design changes described hereinafter.

The disk file unit 59 and the associated interface 83 are omitted from the embodiment of FIG. 4.

In the embodiment of FIG. 4, a confirmation and display unit 60 is connected to the system bus 42 via an interface 84. The confirmation and display unit 60 acts on a combination of video data and related audio data which can not be reproduced in real time during a simulation due to time lags caused by a necessary time for the data transfer via the system bus 42, a necessary time for signal processing in the CPU 41, a necessary time for access to the hard disk unit 53, and the like. In the case of such a combined information, the control file is transferred from the hard disk unit 53 to the confirmation and display unit 60 and the contents of the control file are indicated via the unit 60 in accordance with the program file. Without actually reproducing the combined information in a simulation, the indication of the control file allows a check as to whether the combination of video data and audio data, and the reproduction timings are correct.

In addition, the confirmation and display unit 60 allows an easy check as to whether the data inputted via the video input unit 43 and the audio input unit 45, and the search program produced in the editing unit 47 are in correct reproduction sequences.

The display 49 in the console 48 may be designed to serve also as the confirmation and display unit 60. In this case, the exclusive confirmation and display 60 can be omitted.

DESCRIPTION OF THE FOURTH PREFERRED EMBODIMENT

Figure 5:
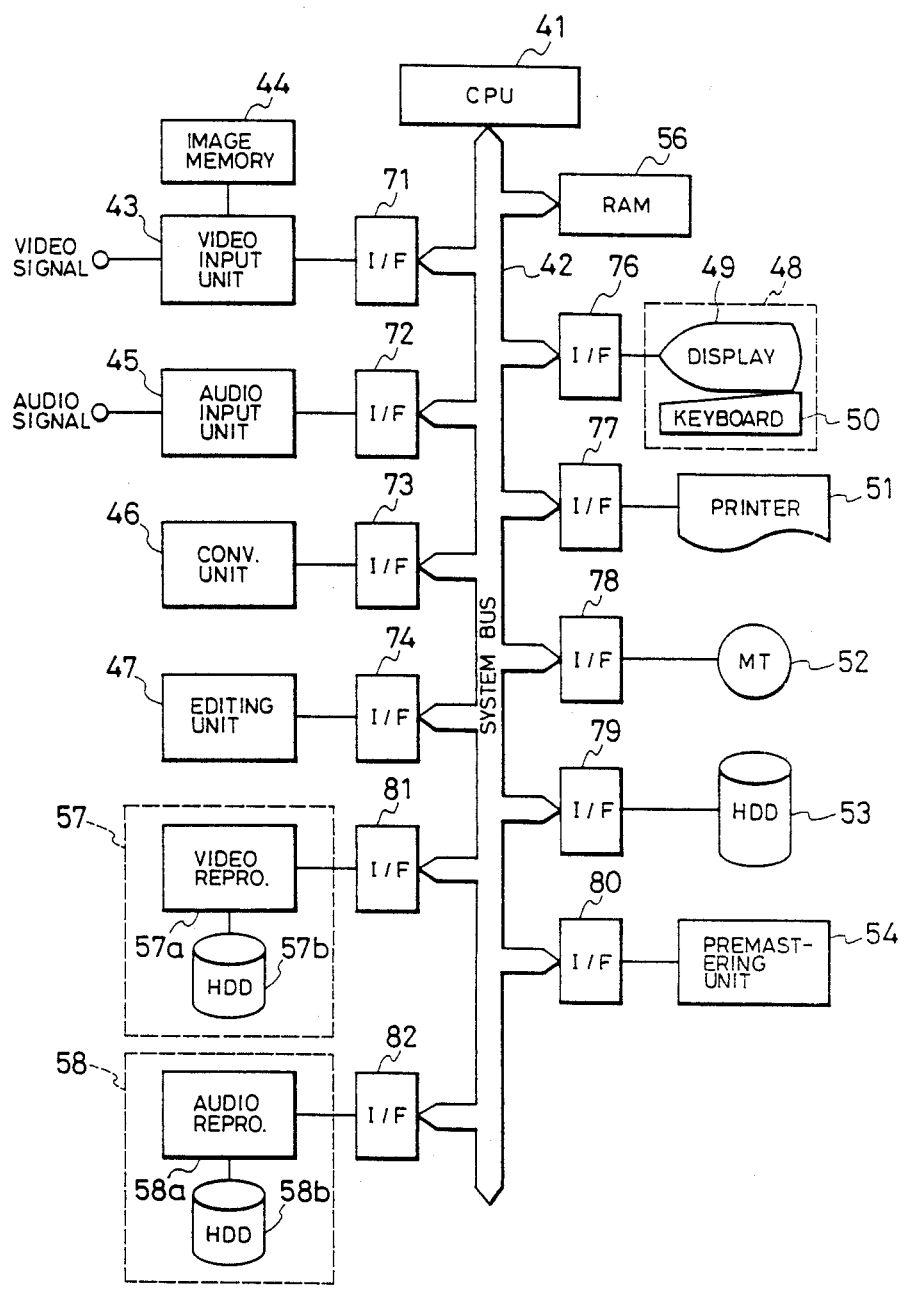
FIG. 5 is a block diagram of an information editing apparatus according to a fourth embodiment of this invention.

FIG. 5 shows a fourth embodiment of this invention which is similar to the embodiment of FIG. 3 except for design changes described hereinafter.

The disk file unit 59 (see FIG. 3) and the associated interface 83 (see FIG. 3) are omitted from the embodiment of FIG. 5.

In the embodiment of FIG. 5, a video output unit 57 includes a combination of a video reproduction unit 57a and a hard disk unit 57b. The video reproduction unit 57a includes a display such as a CRT display. In addition, an audio output unit 58 includes a combination of an audio reproduction unit 58a and a hard disk unit 58b. The audio reproduction unit 58a includes an electricity-to-sound transducer such as a loudspeaker.

Some of combinations of video data and related audio data could not be reproduced in real time during a simulation due to time lags caused by a necessary time for the data transfer via the system bus 42, a necessary time for signal processing in the CPU 41, a necessary time for access to the hard disk unit 53, and the like. In the case of such combined data, the contents of the data files are transferred from the hard disk unit 53 to the hard disk unit 57b of the video output unit 57 and the hard disk unit 58b of the audio ouput unit 58 before a simulative reproduction starts. During a simulation, since the hard disk units 57b and 58b quickly feed the data to the associated reproduction units 57a and 58a, the video and/or character data and the audio data can be reproduced at a speed equal to the speed of a formal reproduction of the video and/or character data and the audio data. Accordingly, the simulative reproduction can be adequately close to the formal reproduction so that a check on the data can be accurate.

DESCRIPTION OF THE FIFTH PREFERRED EMBODIMENT

Figure 6:
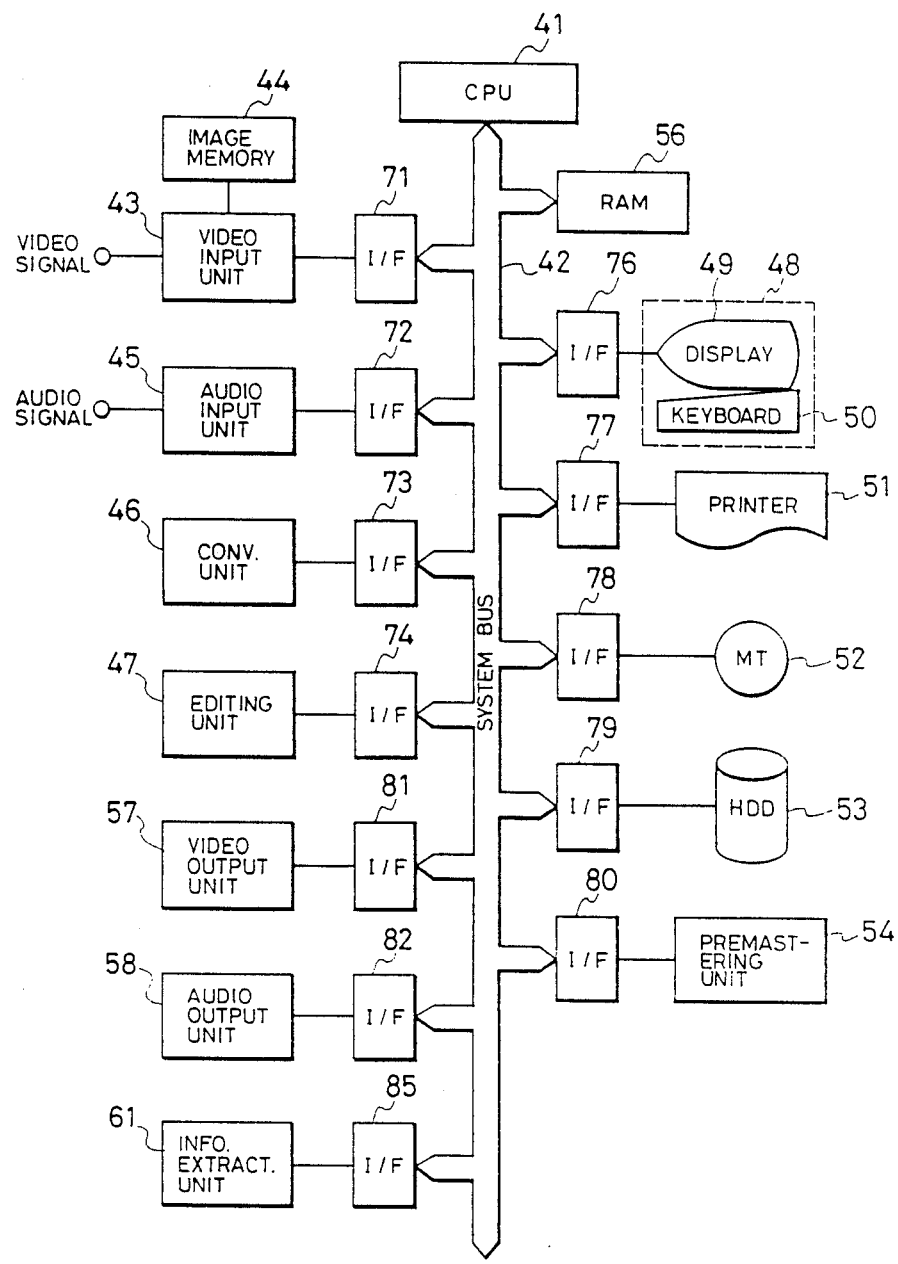
FIG. 6 is a block diagram of an information editing apparatus according to a fifth embodiment of this invention.

FIG. 6 shows a fifth embodiment of this invention which is similar to the embodiment of FIG. 3 except for design changes described hereinafter.

The disk file unit 59 (see FIG. 3) and the associated interface 83 (see FIG. 3) are omitted from the embodiment of FIG. 6.

In the embodiment of FIG. 6, an information extraction unit 61 is connected to the system bus 42 via an interface 85 serves to extract portions of the information stored in the hard disk unit 53.

Figure 7:
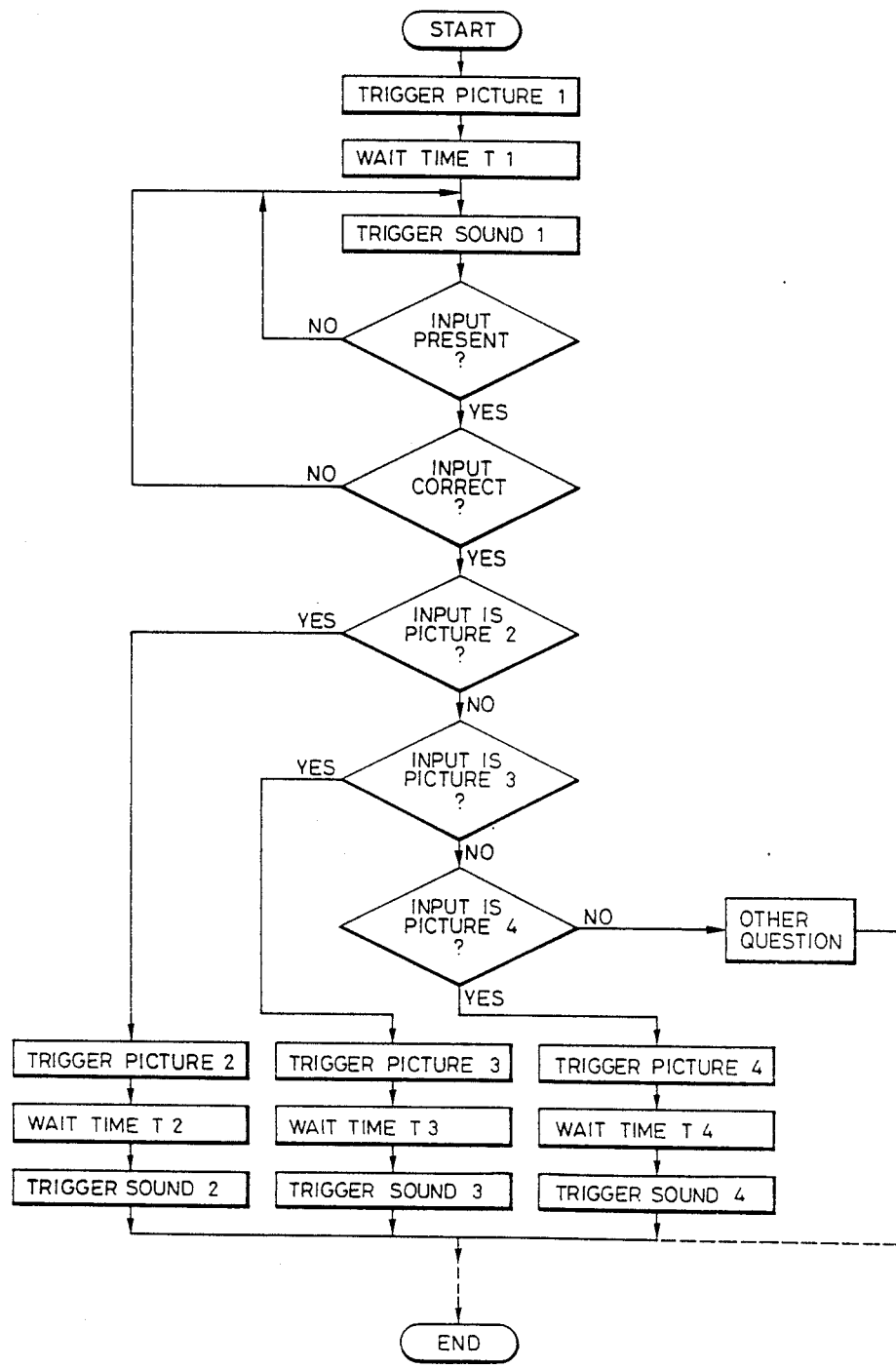
FIG. 7 is a flowchart of one example of a program controlling a simulative reproduction.
Figure 8:
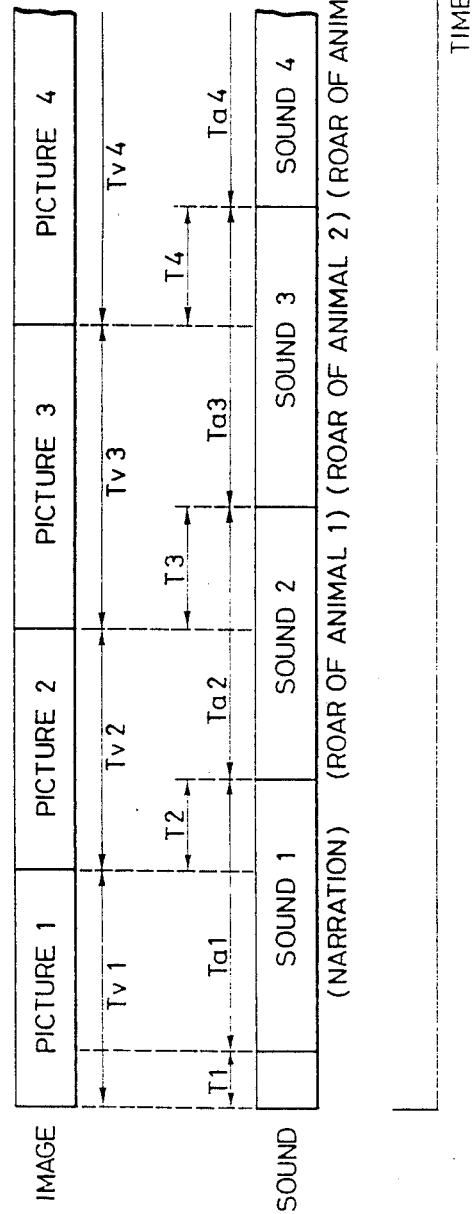
FIG. 8 is a timing diagram of a simulative reproduction executed in accordance with the program of FIG. 7.

The embodiment of FIG. 6 will be described in more detail with reference to FIGS. 7 and 8.

A program determining a sequence of a simulative reproduction is made and set by a user in accordance with a sequence of a formal reproduction of the data from the recording medium. FIG. 7 is a flowchart of one example of the program. FIG. 8 is a timing diagram of a simulative reproduction executed in accordance with the program of FIG. 7.

First, the program orders the CPU 41 to feed a starting trigger signal to the hard disk unit 53 via the system bus 42. When the starting trigger signal is fed to the hard disk unit 53, video data, that is, picture 1, designated by the program are read from the hard disk unit 53 and are transferred to the video output unit 57 via the interfaces 78 and 81, and the system bus 42. Then, the program orders the CPU 41 to feed a trigger signal to the video output unit 57, reproducing the video data, that is, the picture 1, via the video output unit 57.

Secondly, the program orders the CPU 41 to feed a trigger signal to the hard disk unit 53. When the trigger signal is fed to the hard disk unit 53, audio data, that is, sound 1, related to the picture 1 are read from the hard disk unit 53 and transferred to the audio output unit 58 via the interfaces 78 and 82. At a moment following the trigger timing of the picture 1 by a given time T1, the program orders the CPU 41 to feed a trigger signal to the audio output unit 58, reproducing the audio data, that is, the sound 1, via the audio ouput unit 58.

Picture 2 and related sound 2, picture 3 and related sound 3, picture 4 and related sound 4, . . . , are sequentially transferred to the video output unit 57 and the audio output unit 58 and reproduced via the units 57 and 58 in manners similar to the manner of the data transfer and the data reproduction of the picture 1 and the sound 1.

As understood from the previous description, during a simulation, pictures and related sounds are selected and sequentially reproduced in accordance with the program made by the user. In the simulative reproduction, the user checks times (Tv1, Tv2, Tv3, Tv4, . . . ) during which respective pictures last, times (Ta1, Ta2, Ta3, Ta4, . . . ) during which respective sounds last, and differences (T1, T2, T3, T4, . . . ) in time between pictures and related sounds.

For example, in the case of a checked data file concerning an animal book, pictures 1, 2, 3, . . . , show animals respectively and sounds 1, 2, 3, . . . , are roars of the related animals respectively.

In cases where relative timings of reproduction of a picture and a related sound are inappropriate during a simulation, the given times (Tv1, Tv2, Tv3, Tv4, . . . ; Ta1, Ta2, Ta3, Ta4, . . . ; T1, T2, T3, T4, . . . ) and the simulative reproduction sequence are corrected to make the relative timings appropriate. The correction of the given times and the reproduction sequence is performed by handling the keyboard 50 to modify the program. At the same time, given values determined by the formal reproduction program are changed by the conversion unit 46 in accordace with the previously-mentioned correction of the given times.

Some of combinations of video and/or character data and related audio data could not be reproduced in real time during a simulation due to time lags caused by a necessary time for the data transfer via the system bus 42, a necessary time for signal processing in the CPU 41, a necessary time for access to the hard disk unit 53, and the like. The information extraction unit 61 acts on such combined information.

It is now assumed that picture 1 and sound 1 constitute such combined information. In this case, before a simulative reproduction starts, the audio data file corresponding to the sound 1 is transferred from the hard disk unit 53 to the information extraction unit 61, and the portion of the audio data file corresponding to a head portion or another portion of the sound 1 is extracted by the unit 61 and is transferred from the unit 61 to the RAM 56. Then, a simulative reproduction is started and performed as follows. The CPU 41 feeds a trigger signal to the hard disk unit 53. When the hard disk unit 53 receives the trigger signal, the video data corresponding to the picture 1 is transferred from the hard disk unit 53 to the video output unit 57. Then, the CPU 41 feeds a trigger signal to the video output unit 57, reproducing the picture 1 via the video putput unit 57. Next, the CPU 41 feeds a trigger signal to the RAM 56. When the RAM 56 receives the trigger signal, the audio data corresponding to the extracted portion of the sound 1 are transferred from the RAM 56 to the audio output unit 58. At a moment following the moment of the audio data transfer by a given interval T1, the CPU 41 feeds a trigger signal to the audio output unit 58 via the system bus 42 so that the extracted portion of the sound 1 is reproduced via the audio output unit 58. During the simulation, reproduction timings of the picture 1 and the sound 1 are checked. In this way, the combined information is checked by reproducing a portion of the information.

The video output unit 57 and the audio output unit 58 may be replaced by those of FIG. 5. In this case, before a simulative reproduction starts, the video data and the audio data are transferred from the hard disk unit 53 to the hard disk units 57b and 58b (see FIG. 5). During a simulation, the video data supplied from the hard disk unit 57b to the video reproduction unit 57a (see FIG. 5) and the audio data supplied from the hard disk unit 58b to the audio reproduction unit 58a (see FIG. 5) are reproduced. Since the data transfer from the hard disk unit 53 via the system bus 42 is absent during the simulative reproduction, the simulative reproduction is performed essentially independent of time lags caused by a necessary time for the data transfer via the system bus 42, a necessary time for signal processing in the CPU 41, a necessary time for access to the hard disk unit 53, and the like. Accordingly, the simulative reproduction can be performed at the same speed as the speed of a formal information reproduction. It should be noted that the video reproduction unit 57a and the audio reproduction unit 58a may be designed to have functions of extracting portions of the video data and/or the audio data respectively in order to remove the information extraction unit 61.

What is claimed is:

1. An information editing apparatus comprising:
   (a) means for inputting information including pictures, sounds, and characters;
   (b) means for converting a form of the inputted information into a digital signal form in accordance with properties of the information and thus deriving converted information;
   (c) first storage means for holding at least one of the inputted information and the converted information;
   (d) means for editing the information held in the first storage means and thus deriving edited information, and for producing a first application program determining a scenario;
   (e) means for allowing a check on said first application program and for allowing a correction of said first application program into a second application program in accordance with a result of said check on the first application program;
   (f) second storage means for holding the edited information;
   (g) means for reproducing the information held in either of the first storage means and the second storage means in a reproduction sequence determined by either of the first application program and the second application program to allow a check on said information; and
   (h) means for outputting the information held in either of the first storage means and the second storage means.

2. The apparatus of claim 1 wherein the inputting means comprises means for exclusively inputting picture information, means for exclusively inputting sound information, and means for exclusively inputting character information, wherein each of the exclusively inputting means has a function of converting the related inputted information.

3. The apparatus of claim 1 wherein the reproducing means comprises reproducing/outputting means for reproducing and outputting any of pictures, sounds and characters, and means for controlling the reproducing-/outputting means, wherein the reproducing means is operative to reproduce the information held in either of the first storage means and the second storage means in accordance with the reproduction sequence to allow a check on the edited information and the reproduction sequence.

4. The apparatus of claim 3 wherein the reproducing means comprises an exclusive storage unit to which the information is transferred from either of the first storage means and the second storage means, and wherein the reproducing means reproduces the information in the exclusive storage unit in the reproduction sequence.

5. The apparatus of claim 1 further comprising third storage means for holding any of the inputted information, the converted information, the edited information, and the reproduction sequence in a manner that the held information and the sequence can be outputted.

6. The apparatus of claim 5 wherein the reproducing means is operative to reproduce the information and the reproduction sequence held in the third storage means to allow a check on the information and the reproduction sequence held in the third storage means.

7. The apparatus of claim 1 further comprising confirming/indicating means for confirming contents and operation of the inputted information and the reproduction sequence and indicating contents of the confirmation.

8. The apparatus of claim 7 wherein the confirming-/indicating means comprises means for reproducing and outputting any of pictures, sounds, and characters, means for checking contents and operation of the reproduction sequence, and means for indicating contents of the confirmation, and wherein the confirming/indicating means is operative to reproduce the information held in either of the first storage means and the second storage means and to indicate contents and kinds of the reproduced information in accordance with the reproduction sequence to confirm contents and operations of the information and the reproduction sequence.

9. The apparatus of claim 1 further comprising means for converting the reproduction sequence into a form which can be outputted.

10. The apparatus of claim 1 wherein the editing means is operative to correct the reproduction sequence.

11. The apparatus of claim 1 further comprising means for extracting a portion of the information held either of the first storage means and the second storage means.

12. An information editing apparatus as recited in claim 1 further including central processing means and a system bus means, said central processing means communicating via said system bus means at least with said means for inputting, said means for converting, said first storage means and said means for editing, thereby to control operation of said information editing apparatus.

13. An information editing apparatus as recited in claim 12 wherein said means for confirmation comprises second output means, said second output means reproducing edited information provided thereto in accordance with said another application program to provide said simulated output for said confirmation of accuracy of said another application program, said means for confirmation further comprising second central processing means for controlling said second output means in accordance with said another application program.

14. An information editing apparatus comprising:
(a) means for inputting information including pictures, sounds, and characters;
(b) means for converting a form of the inputted information into a digital signal form in accordance with properties of the information and thus deriving converted information;
(c) first storage means for holding the inputted information or the converted information;
(d) means for editing the information held in the first storage means and thus deriving edited information, and for producing a first application program determining a scenario;
(e) means for allowing a check on said first application program and for allowing a correction of said first application program into a second application program in accordance with a result of said check on the first application program;
(f) second storage means for holding the edited information;
(g) means for reproducing the information held in either of the first storage means and the second storage means in a reproduction sequence determined by either of the first application program and the second application program to allow a check on said information;
(h) means for correcting the information held in either of the first storage means and the second storage means and the reproduction sequence in accordance with a result of the check; and
(i) means for outputting the information held in either of the first storage means and the second storage means.

15. The apparatus of claim 14 further comprising means for extracting a portion of the information held in either of the first storage means and the second storage means, and means for allowing the extracted portion of the information to be reproduced by the reproducing means.

16. An information editing apparatus comprising:
(a) means for inputting video, audio and textual information;
(b) means for converting the inputted information into a digital signal form and for providing converted digital information;
(c) first storage means for holding at least one of the inputted information and the converted digital information;
(d) output means for generating an output signal representing information edited by said information editing apparatus;
(e) means for editing the information held in the first storage means in accordance with an application program for editing the information from said first storage means and for transmitting edited information to said output means;
(f) means for producing another application program for determining a scenario representing at least any of a type of information to be outputted, a method of searching for and retrieving the information, and a sequence of reproduction and output of the edited information;
(g) means for confirmation of accuracy of said another application program by generating a simulated output of information edited in accordance with said another application program;
(h) means for correcting said another application program and for generating a further, corrected, application program when said simulated output is deemed inaccurate as a result of said confirmation of said another application program by said means for confirmation; and
(i) means for transmitting said further application program to said means for editing and for editing digital information in accordance with said further application program, thereby to provide correctly edited output information to said output means.

17. An information editing apparatus as recited in claim 16 wherein said means for confirmation comprises second output means, said second output means reproducing edited information provided thereto in accordance with said another application program to provide said simulated output for said confirmation of accuracy of said another application program.

18. An information editing apparatus as recited in claim 17 wherein said means for confirmation further comprises means for controlling said second output means in accordance with said another application program.

* * * * *